United States Patent [19]
Bremer et al.

[11] Patent Number: 5,891,345
[45] Date of Patent: *Apr. 6, 1999

[54] TREATMENT PROCESS FOR WASTEWATER STREAMS

[75] Inventors: Noel Jerome Bremer, Kent; Gary Vernon Goeden, Mentor; David Roy Woodbury, Bedford Heights, all of Ohio

[73] Assignee: The Standard Oil Company, Cleveland, Ohio

[*] Notice: The term of this patent shall not extend beyond the expiration date of Pat. No. 5,562,834.

[21] Appl. No.: 921,302

[22] Filed: Aug. 29, 1997

Related U.S. Application Data

[63] Continuation of Ser. No. 723,440, Oct. 7, 1996, abandoned, which is a continuation-in-part of Ser. No. 388,319, Feb. 14, 1995, Pat. No. 5,635,076.

[51] Int. Cl.⁶ ..................................................... C02F 1/20
[52] U.S. Cl. ...................... 210/750; 159/47.3; 210/763; 210/903; 210/908; 210/909; 423/237; 423/239.1; 423/245.3
[58] Field of Search ................................. 159/47.3, 901; 203/14, 21, 98, DIG. 6, DIG. 8; 210/750, 757, 762, 763, 903, 908, 909; 423/235, 237, 239.1, 245.3, 247

[56] References Cited

U.S. PATENT DOCUMENTS

| | | | |
|---|---|---|---|
| 2,944,396 | 7/1960 | Barton et al. | 210/763 |
| 3,804,756 | 4/1974 | Callahan et al. | 210/762 |
| 3,970,739 | 7/1976 | Shiraishi et al. | 210/763 |
| 4,218,358 | 8/1980 | Armstrong et al. | 528/492 |
| 4,240,808 | 12/1980 | Garber et al. | 55/48 |
| 4,713,089 | 12/1987 | Robbins | 55/52 |
| 5,053,581 | 10/1991 | Hildinger et al. | 585/638 |
| 5,160,636 | 11/1992 | Gilles et al. | 210/763 |
| 5,183,577 | 2/1993 | Lehmann | 210/761 |
| 5,192,453 | 3/1993 | Keckler et al. | 210/761 |
| 5,205,906 | 4/1993 | Grutsch et al. | 210/762 |
| 5,246,584 | 9/1993 | Donaldson et al. | 210/603 |
| 5,358,646 | 10/1994 | Gloyna et al. | 210/762 |
| 5,562,834 | 10/1996 | Bremer et al. | 210/750 |
| 5,635,076 | 6/1997 | Bremer et al. | 210/750 |

OTHER PUBLICATIONS

M. Nimlos et al., "Direct Mass Spectrometric Studies of the Destruction of Hazardous Wastes. I. Catalytic Steam Reforming of Chlorinated Hydrocarbons.", *Environ. Sci Technol.*, 1992, 26, pp. 545–552.
Chem. Abstracts CA97(10):78342K CA.
Chem. Abstracts CA93(26):242196f CA.
"Novel Column Internals Boost Stripping Efficiency.", Chemical Engineering (Plant Notebook), Jan. 1994, p. 129.
M. Antal, Jr., "Synthesis Gas Production from Organic Wastes by Prolysis/Steam Reforming.", Dept. of Mech. & Aerospace Eng., Princeton Univ.
Chem. Abstracts CA109(22):192605g CA.
Chem. Abstracts CA103(16):126516m CA.

*Primary Examiner*—Peter A. Hruskoci
*Attorney, Agent, or Firm*—David P. Yusko; David J. Untener

[57] ABSTRACT

A process for the destruction of organic compounds selected from the group consisting of nitriles, aromatics, heteroaromatics, amides, organic acids, aldehydes and alcohols from wastewater, comprising contacting volatilized wastewater with a catalyst at an elevated temperature in the absence of added oxygen, so as to convert volatile organic compounds and ammonia to a mixture comprising hydrogen and carbon dioxide which are separated and removed from the stream, yielding a purified aqueous stream, substantially free of organic compounds.

20 Claims, 1 Drawing Sheet

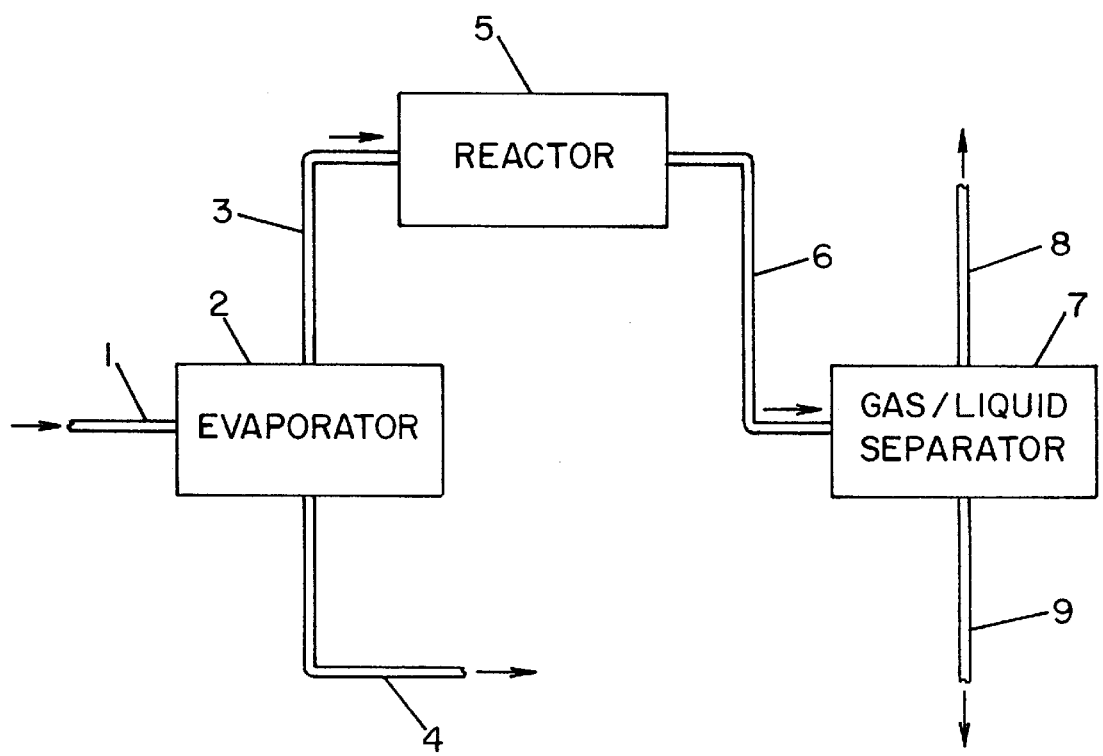
FIGURE

TREATMENT PROCESS FOR WASTEWATER STREAMS

REFERENCE TO RELATED APPLICATIONS

This is a continuation of application Ser. No. 08/723,440 filed Oct. 7, 1996, now abandoned which is a continuation-in-part of application Ser. No. 08/388,319 filed Feb. 14, 1995, now U.S. Pat. No. 5,635,076.

BACKGROUND OF THE INVENTION

1. Field of the Invention

This invention relates to a process for the purification of acrylonitrile plant wastewater streams. More particularly, this invention relates to a catalytic process for the eradication of organics and ammonia from such wastewater streams. This invention further relates to a catalytic process for the eradication of organics, such as nitriles, aromatics, heteroaromatics, amides, organic acids, aldehydes, and alcohols (including glycols) from any wastewater stream.

2. Description of the Prior Art

Acrylonitrile is one of the highest volume (top fifty) chemicals produced in the U.S. and the world. Nearly all acrylonitrile is produced from propylene, oxygen, and ammonia with either a bismuth phosphomolybdate or an uranium-based compound as catalyst. Acrylonitrile has many uses including acrylic and modacrylic fibers, ABS and acrylonitrile-styrene copolymers, nitrile rubber, cyanoethylation of cotton and synthetic soil blocks (acrylonitrile polymerized in wood pulp).

Acrylonitrile plants generate a significant volume of wastewater containing organic compounds and ammonia. Methods for treating or disposing these streams include thermal or catalytic incineration, biotreatment, wet oxidation and reduction and deep welling. Currently in the United States, much of the wastewater streams from acrylonitrile plants are disposed of by the deep welling of streams with low levels of contaminants and the incineration of streams with higher levels of impurities. While these disposal methods are environmentally sound and protective and represent general industry practice, producers of acrylonitrile are studying alternative methods of wastewater handling. Biotreatment is often viewed as the future alternative form of treatment of acrylonitrile plant wastewater streams. However, biotreatment is a very expensive alternative and may not be able to satisfactorily remove all impurities from such streams.

A goal of the instant invention is an alternative process for the eradication of organic constituents and other impurities of acrylonitrile plant wastewater streams.

SUMMARY OF THE INVENTION

The invention is a process for the destruction of organic compounds and ammonia from wastewater, specifically wastewater from acrylonitrile plants, comprising contacting a volatilized wastewater stream in a reactor with a catalyst at an elevated temperature so as to convert the volatile organic components and ammonia in the stream to a mixture comprising hydrogen gas, nitrogen gas and carbon dioxide.

More specifically the invention is a process for the destruction of organic wastes and ammonia from acrylonitrile plant wastewater streams, comprising (i) volatilizing the wastewater to produce a vaporous stream comprising steam, ammonia and the volatile organic compounds;

(ii) contacting, in a reactor, the vaporous stream with a catalyst at an elevated temperature so as to convert the organic compounds and ammonia to a mixture comprising hydrogen gas, nitrogen gas and carbon dioxide;

(iii) cooling and separating an effluent stream from the reactor to produce a vaporous stream comprising predominantly hydrogen gas, nitrogen gas and carbon dioxide and a liquid stream comprising predominantly water, which is substantially free of organic compounds and ammonia and which is boiler quality feed water.

One embodiment of the invention is a process for the destruction of organic compounds(e.g. nitrites, aromatics, heteroaromatics, amides, organic acids, aldehydes and alcohols) from wastewater, comprising contacting a volatilized wastewater stream in a reactor with a catalyst at an elevated temperature, in the absence of added oxygen, so as to convert the volatile organic components in the stream to a mixture comprising hydrogen gas, and carbon dioxide. If the volatile organic components also contain nitrogen (e.g. nitrobenzene or pyridine, the resulting product will also include nitrogen.

Another embodiment of the invention is a process for the destruction of organic compounds selected from the group consisting of nitriles, aromatics, heteroaromatics, amides, organic acids, aldehydes and alcohols from wastewater streams, comprising (i) volatilizing the wastewater to produce a vaporous stream comprising steam, and volatile organic compounds;

(ii) contacting, in a reactor, the vaporous stream with a catalyst at an elevated temperature, in the absence of added oxygen, so as to convert the organic compounds and ammonia to a mixture comprising hydrogen gas and carbon dioxide;

(iii) cooling and separating an effluent stream from the reactor to produce a vaporous stream comprising predominantly hydrogen gas, and carbon dioxide and a liquid stream comprising predominantly water, which is substantially free of organic compounds and which is boiler quality feed water.

As used herein, "wastewater" and "wastewater streams" includes any aqueous stream comprising a nitrile, aromatic, heteroaromatic, amide, organic acid, aldehyde or an alcohol.

BRIEF DESCRIPTION OF THE DRAWINGS

The FIGURE is a process flow diagram illustrating a preferred embodiment of the instant invention wherein the water and volatile organic components of the wastewater stream are volatilized in an evaporator prior to being fed to the reactor.

It will be understood by those skilled in the art that, as the drawing is diagrammatic, further items of equipment such as condensers, heat exchangers, reflux drums, column reboilers, pumps, vacuum pumps, temperature sensors, pressure sensors, pressure relief valves, control valves, flow controllers, level controllers, holding tanks, storage tanks, and the like, would additionally be required in a commercial plant. The provision of such additional items of equipment forms no part of the present invention and is in accordance with conventional chemical engineering practice.

DETAILED DESCRIPTION OF THE INVENTION

The invention is a process to eradicate organic compounds and ammonia from acrylonitrile plant wastewater streams by volatilizing said streams and then contacting in a reactor the volatilized streams with a catalyst so as to convert the volatile organic constituents and ammonia to a mixture comprising hydrogen, nitrogen and carbon dioxide. The reactor effluent comprising these reaction products and steam is then cooled to condense the steam and to separate and remove the gaseous reaction products. The resulting condensate is a purified aqueous stream substantially free of organic wastes and ammonia.

Acrylonitrile plants generate a significant quantity of wastewater comprising organic products and by-products of the acrylonitrile process, which are suitable for treatment by the instant process. Such streams comprise one or more of the following constituents: nitriles, such as acrylonitrile and methacrylonitrile, aromatics, hetero-aromatics, such as pyridine, amides, organic acids, aldehydes, alcohols and ammonia. In fact, one embodiment of the instant process is to treat wastewater streams comprising such materials resulting from sources other than acrylonitrile plants. Specifically the instant process may be employed to eradicate organics compounds, such as nitriles, aromatics, heteroaromatics, amides, organic acids, aldehydes and alcohols (including glycols) from any wastewater stream. Specific compounds which may be eradicated from such wastewater streams include 2-(2-methoxyethoxy)ethanol), ethylene glycol, benzene and pyridine.

The wastewater stream is volatilized prior to contacting the catalyst. The wastewater stream is volatilized to a vaporous stream comprising steam and the volatile components of the wastewater stream. These volatile components are typically the volatile organics present in the wastewater stream and ammonia (if present). The wastewater may be volatilized in an evaporator (i.e. a vessel capable of receiving both the liquid and vapor phases of the wastewater wherein the liquid wastewater is volatilized using heat and or vacuum) or other unit operation prior to being fed to the reactor or the wastewater may be fed to the reactor as a liquid and be volatilized upon entry to the reactor, but prior to contacting the catalyst. If the wastewater is volatilized in an evaporator the non-volatile components of the wastewater stream are concentrated in the evaporator and then subsequently removed from the evaporator.

The instant process is conducted in the absence of added air or molecular oxygen. The instant process is a "steam reforming" process. Although not completely understood and not wishing to be bound by a particular theory, it is believed that the presence of steam (resulting from the water in the wastewater stream at the elevated temperatures and pressures utilized for this process)in contact with the organics and catalyst at process conditions facilitates the conversion of the organic compounds in the wastewater to hydrogen gas, carbon dioxide and nitrogen gas (if a nitrogen compound is present in the wastewater stream).

In this invention a wide range of catalyst and reactors may be used. The reactors may be fixed-bed, fluid bed, transfer-line or other mode of catalytic reactor. The reactors may be reformer type reactors consisting of multiple catalyst-containing tubes arranged in parallel which are heated up in a fixed furnace.

The operating conditions employed in the reactors can vary appreciably. Any suitable conditions effective for selectively converting the ammonia and organic components of the wastewater stream to a mixture comprising nitrogen gas, hydrogen gas and carbon dioxide can be employed in the present invention. Preferably, the reaction temperature will be in the range of from about 250° C. to about 1000° C., more preferably in the range from about 350° C. to about 800° C. The pressure can be in the range of from atmospheric to about 1000 psig. However, higher pressures can be employed. The steam to hydrocarbon weight ratio can be in the range of from about 5:1 to about 10,000:1. The liquid space velocity can be in the range of about 0.01 to about 1,000, preferably about 1 to about 100 volumes of wastewater per volume of catalyst per hour.

In the practice of the instant invention, single or multiple catalytic reactors may be used. Multiple reactors may be arranged in parallel or in series.

Any suitable catalyst which is active for selectively converting the ammonia and the volatile organic compounds found in acrylonitrile plant wastewater streams to a mixture comprising predominantly hydrogen, carbon dioxide and nitrogen in the presence of steam can be employed in the practice of the invention.

Typical catalyst includes (1) reduced nickel alumina-supported catalyst or (2) supported and reduced platinum group metal catalyst, both catalyst types optionally being promoted with an alkali metal or alkaline earth metal.

The nickel catalyst used in the process is preferably a nickel-alumina catalyst containing from 5 to 90 weight percent nickel on a reduced basis and 0.5 to 10 weight percent alkali or alkaline earth metal. In this application, the values for weight percent are based on the total weight of the catalyst. Instead of alumina, other natural or synthetic silica-containing material, such as kieselguhr, silica, silica-alumina, silica-zirconia, the natural or synthetic crystalline aluminosilicates, and the like, can be used. The alkali metal or alkaline earth metal can be applied to the catalyst as a hydroxide, carbonate, or other soluble salt. Potassium carbonate is a presently preferred alkaline material.

The platinum group metals for use in this invention can be ruthenium, rhodium, osmium, iridium, platinum, or palladium. Mixtures of such metals and/or their compounds can also be used. Ruthenium is a presently preferred platinum group metal.

The platinum group metals can be incorporated into any of the known natural or synthetic refractory inorganic oxide materials known as supports such as alumina, silica, magnesia, zirconia, titania, silica-alumina, the natural or crystalline aluminosilicates, and the like. The amount of platinum group metal present in the catalyst composition can vary from 0.01 to 20 weight percent, preferably in amounts less than about 10 percent by weight. The amount of alkali metal or alkaline earth metal present in the catalyst can range from 0 to 10 weight percent. The alkali metal or alkaline earth metal can be applied as hydroxide, carbonate, or other soluble salt. The term "soluble" is intended to include either aqueous or non-aqueous solvents, although water is presently preferred. Potassium carbonate is the presently preferred alkali or alkaline earth compound.

As indicated above, the nickel component or platinum group metal component of the catalyst can be reduced and stabilized to prevent reaction with the oxygen in the air at any point subsequent to the addition of the metal. Such reduction and stabilization permits the loading of the catalyst into the reactor and the use of the catalyst in the reaction without a reduction step. However, it is within the scope of the invention to reduce the catalyst with hydrogen or other suitable reducant (e.g. carbon monoxide, light hydrocarbons) after it is in the reactor.

Another catalyst which can be employed in the process of the invention comprises a supported chromate, tungstate, or molybdate of the iron group metals, including iron, cobalt, and nickel, promoted with a barium salt of an organic acid such as barium acetate. Preferably, the support for the catalyst comprises an aluminum-containing support material such as alumina or calcium aluminate. The catalyst will ordinarily contain from 1 to 10 weight percent of the iron group metal and from 5 to 25 weight percent of the chromate, tungstate, or molybdate, calculated as the oxide. The remainder of the catalyst is comprised of support material, such as alumina or other aluminum-containing material.

The effluent stream from the reactor comprises water, nitrogen gas, hydrogen gas and carbon dioxide. The effluent stream is cooled to condense the water vapor and the gases are separated and removed in a gas/liquid separator. These off-gases can be recycled to the reactor, burned for fuel value or vented. The resulting aqueous stream is substantially free of organics and ammonia and is boiler quality feed water, which may be used for steam generation or other uses on site.

Referring now to the drawing, the Figure illustrates a preferred embodiment of the instant invention. In the Figure, acrylonitrile plant wastewater is fed via line 1 to the evaporator 2. In the evaporator, water, ammonia and volatile organic components are volatilized and removed from the evaporator via line 3 and fed to the reactor 5. Non-volatile components are removed from the evaporator via line 4. In the reactor, the volatilized water, ammonia and organics are passed over a suitable catalyst at an elevated temperature. The ammonia and organics react to form nitrogen, hydrogen and carbon dioxide. These reaction products and water vapor exit the reactor via line 6 and are fed to the gas/liquid separator 7. In the gas/liquid separator the reactor effluent is cooled to condense the water vapor which is removed from the separator via line 9. The gaseous reaction products exit the gas/liquid separator via line 8.

SPECIFIC EMBODIMENTS

In order to illustrate the instant invention, the following Examples are provided.

The feedstock used in Examples 1 through 3 was wastewater from the recovery and purification section of an acrylonitrile plant. Three different wastewater streams were processed. Physical properties of each for the wastewater streams are given in Table 1. The wastewater feedstock was pumped downward through a stainless steel reactor tube containing commercial catalyst (United Catalyst C11-9-02, nominal composition 12% Ni and 88% refractory alumina support, 10–20 mesh particles). Reaction conditions were as shown in Table 2. The reactor effluent first passed through a heat-exchanger to condense steam and then the product mixture was sent to a gas/liquid separator where water was separated from the product gases. Product water was analyzed for pH, TOC, COD, volatile and semi-volatile organics, and ammonium ion. Reaction off-gas was analyzed for $H_2$, $CO_2$, CO, $N_2$, $O_2$, $CH_4$, $C_2$–$C_4$ hydrocarbons, and $NO_x$. Tables 3 and 4 show the product analyses.

TABLE 1

Properties of the Wastewater Feedstock

| Wastewater Stream | pH | TOC mg/L | COD mg/L | $NH_{4+}$ mg/L | Total Nitrogen mg/L |
|---|---|---|---|---|---|
| A | 9.0 | 1,100 | 1,970 | 94 | 590 |
| B | 5.4 | 7,180 | 17,900 | 520 | 3,300 |
| C | 5.4 | 31,200 | 74,100 | 3,700 | 14,000 |

TOC = Total Organic Carbon
COD = Chemical Oxygen Demand

TABLE 2

Reaction Conditions

| Example | Wastewater Stream | Temperature Deg. C. | Pressure PSI | Wastewater Feed Rate mL/cc catalyst/Hr |
|---|---|---|---|---|
| 1 | A | 500 | 20 | 1.13 |
| 2 | B | 500 | ambient | 0.87 |
| 3 | C | 750 | ambient | 0.69 |

TABLE 3

Analysis of Product Condensate

| Example | Wastewater Stream | On-Stream Hours | pH | COD mg/L | TOC mg/L | $NH_{4+}$ mg/L | Volatile and Semi-volatile Organics |
|---|---|---|---|---|---|---|---|
| 1 | A | 19 | 5.6 | 6 | 5 | NA | ND |
| 1 | A | 71 | 5.9 | 0 | 0 | 14.1 | ND |
| 2 | B | 4 | 6.5 | 0 | 0 | 70.0 | ND |
| 3 | C | 7 | 4.6 | 1 | <40 | 2.2 | ND |

NA = not analyzed
ND = none detected

TABLE 4

Analysis of Off-Gas

| Example | Wastewater Stream | On-Stream Hours | $H_2$ Vol. % | $CO_2$ Vol. % | $N_2$ Vol. % | CO Vol. % | $CH_4$ Vol. % | $O_2$ Vol. % | $NO_x$ ppm |
|---|---|---|---|---|---|---|---|---|---|
| 1 | A | 19 | 66.0 | 25.5 | 6.0 | <0.05 | <0.05 | ND | NA |
| 1 | A | 71 | 65.6 | 26.1 | 6.0 | <0.05 | <0.05 | ND | NA |
| 2 | B | 4 | 67.1 | 27.3 | 5.5 | 0.11 | ND | ND | NA |
| 3 | C | 7 | 65.3 | 23.8 | 6.5 | 4.4 | <0.05 | ND | <10 |

NA = not analyzed
ND = none detected

In Example 1, a low TOC acrylonitrile plant wastewater stream was treated by the process of this invention at 500° C. The contained organic wastes were completely converted to hydrogen, carbon dioxide and nitrogen gases. Product condensate water was essentially free of organic carbon and contains a only very low level of ammonium ion.

Example 2 demonstrated complete destruction of the organic wastes contained in an acrylonitrile plant wastewater stream having a substantially higher organic carbon loading. At 500° C. reaction temperature, the contained organic waste products were completely converted to essentially hydrogen, nitrogen, and carbon dioxide gases. Product condensate water was free of organic carbon. The ammonium ion content of the product condensate water was higher due to the increased nitrogen loading of the feedstock wastewater.

Example 3 shows the effectiveness of this process for purifying acrylonitrile process wastewaters having very high organic carbon and nitrogen loadings. At 750° C., the contained organic components were completely destroyed by conversion to essentially hydrogen, nitrogen, carbon dioxide, and carbon monoxide gases. The product gas was determined to be essentially free of $NO_x$ pollutants. Product condensate water was essentially free of organic carbon and had a very low ammonium ion content.

General Procedure for Examples 4 through 8

In order to illustrate the utility of the instant invention on other waste streams, four different feeds simulating organic wastestreams were treated by the process of the instant invention.

For these examples, a 40 cc fixed-bed reactor was used. The stainless-steel reactor tube had an internal diameter of ½ "and the tube was 17" long. A ⅛" OD stainless steel thermowell was inserted down the center of the tube. A quartz wool plug supported the catalyst bed within the reactor.

The feedstock was pumped downward through a stainless steel reactor tube containing commercial catalyst (United Catalyst C11-9-02, nominal composition 12% Ni and 88% refractory alumina support, 10–20 mesh particles). Reaction conditions were as shown in the Table. The reactor effluent first passed through a heat-exchanger to condense steam and then the product mixture was sent to a gas/liquid separator where water was separated from the product gases. Product water was analyzed for pH, TOC, COD, volatile and semi-volatile organics, and ammonium ion. Reaction off-gas was analyzed for $H_2$, $CO_2$, CO, $N_2$, $O_2$, $CH_4$, $C_2$–$C_4$ hydrocarbons, and $NO_x$. The product analyses for each feed is shown in Table 5.

Example 4: Ethylene Glycol/Water

Ethylene Glycol was added to water to prepare a 1.0 wt. % solution. A fresh charge of C11-9-02 catalyst (40 cc, 57.2 g) was loaded into the reactor and pre-reduced in $H_2/N_2$. For these tests a vaporizer tube was installed in the feed line ahead of the reforming reactor. The vaporizer was maintained at 200° C. to insure that the incoming feed was completely vaporized before it entered the reactor and contacted the catalyst bed. At 500° C. and 1 second contact time, ethylene glycol was completely destroyed. No organic carbon was present in the product water (i.e. COD & TOC<10 ppm). $H_2$ (71.1 Vol. %), $CO_2$ (28.8 Vol. %) and a trace of CO (0.07 Vol. %) comprised the off-gas. The carbon balance was 101%.

Example 5: 2-(2-Methoxyethoxy)ethanol

A 1.0 wt. % solution of 2-(2-Methoxyethoxy)ethanol was prepared by dissolving 10.10 g of 2-(2-Methoxyethoxy) ethanol in 989 g. distilled water. The same catalyst charge used in the ethylene glycol test was used here. The vaporizer tube furnace was kept at 200° C. At 500° C. and 1 second contact time destruction of 2-(2-Methoxyethoxy)ethanol was complete. Organics were not observed in the product water. The off-gas comprised only $H_2$ (71.7 Vol. %), $CO_2$ (28.2 Vol. %), and a trace of CO (0.09 Vol. %). The carbon balance was 102%.

Example 6: Pyridine/Water

A 0.5 wt. % pyridine solution was made up by dissolving 5.02 g pyridine in 998.89 g distilled water. The catalyst used in the oxygenate reforming experiments was used here without prior discharge from the reactor tube. The feed solution vaporizer was kept at 200° C. With the reactor at 500° C. and the liquid feed rate at 45.5 cc/hr (1.1 second contact time) pyridine was completely destroyed. No pyridine was detected in the product water by gas chromatography (hereinafter "GC"). COD and TOC analysis of the product water also indicated the absence of any organics. The off-gas composition was 69.5% $H_2$, 27.8% $CO_2$, 2.6% $N_2$ and a 0.06% Co. The carbon balance was 99%.

Since the nitrogen content of the pyridine feed solution is known precisely, a nitrogen balance can be calculated based on pyridine-N in and $N_2$ gas out. This calculation gives a nitrogen balance of 97%.

Example 7: Benzene/Water

Benzene was stirred with water at room temperature to prepare an aqueous feed solution containing 694 ppm benzene. A fresh charge of United Catalyst C-11-9-02 steam hydrocarbon reforming catalyst (40 cc, 55.3 g) was loaded into the reactor and pre-reduced in $H_2/N_2$. Table 5 shows results of steam reforming the benzene solution. Reactor temperature was maintained at 500° C. and feed solution flow rate was 45.4 mL/hr (1.1 second contact time). A recovery run (Run 4) was made 1.5 hours after initiating feed flow. GC analysis was used to detect benzene in the product water and none was observed (detection limit<5 ppm). The off-gas contained only $H_2$ and $CO_2$. A second recovery run (Run 5) was made after 5 hours and similar results were obtained.

Example 8: Nitrobenzene

An aqueous nitrobenzene solution (1820 ppm) was prepared by stirring 1.82 g nitrobenzene with 1000 g distilled water for 16 hours. The catalyst charge for this reforming test was that used in the pyridine test without alteration. A feed solution vaporizer, kept at 200° C., was used in this experiment. Table 4 gives the results of nitrobenzene-steam reforming. Destruction of nitrobenzene was observed at 500° C. and 1.1 second contact time. GC analysis determined that product water was free of nitrobenzene. COD and TOC analysis confirmed the absence of organics in the product water. The off-gas primarily contained $H_2$, $CO_2$ and $N_2$. The carbon balance was only 37%, and the nitrogen balance was 62%. $NO_x$ in the off-gas 3 ppm.

TABLE 5

Treatment of Wastestreams
Containing Volatile Organic Compounds - Reaction Conditions and Product Analysis

| Example # | Feed | Temperature Deg. C | Liquid Feed Rate, mL/Hr | c.t. sec. | Time on Stream, Hrs | pH | COD mg/L | TOC mg/L | NH4 mg/L |
|---|---|---|---|---|---|---|---|---|---|
| 4 | Ethylene Glycol 1.0 Wt. % | 500 | 45.4 | 1.1 | 6 | 4.2 | 0 | 0 | — |
| 5 | 2-(2-Methoxyethoxy)-ethanol; 1.0 Wt. % | 500 | 45.3 | 1.1 | 6 | 4.4 | 0 | 0 | — |
| 6 | Pyridine 0.5 Wt. % | 500 | 45.5 | 1.1 | 7 | 5.6 | 0 | 0 | 27.3 |
| 7 | Benzene 694 ppm | 500 | 45.4 | 1.1 | 5 | NA | NA | NA | — |
| 8 | Nitrobenzene 1820 ppm | 500 | 45.4 | 1.1 | 8 | 6.9 | 0 | NA | 0.7 |

| Example # | C as CO2 in liq. prod.- mg/L | Liquid GC Trace | Off-gas Rate cc/Min | H2 Volume % | CO2 Volume % | N2 Volume % | CO Volume % | C-Bal by CO2 Mode % |
|---|---|---|---|---|---|---|---|---|
| 4 | 114 | Baseline | 19.3 | 71.1 | 28.8 | — | 0.07 | 101 |
| 5 | 77 | Baseline | 26.0 | 71.7 | 28.16 | — | 0.09 | 102 |
| 6 | 110 | Baseline | 19.4 | 69.5 | 27.8 | 2.64 | 0.06 | 99 |
| 7 | NA | Baseline | 2.91 | 93.5 | 6.5 | — | 0 | |
| 8 | NA | Baseline | 2.53 | 78.1 | 18.7 | 2.55 | 0 | |

(a) All runs at atmospheric pressure

The foregoing embodiments of the present invention have been presented for purposes of illustration and description. This description is not intended to be exhaustive or to limit the invention to the precise form disclosed, and obviously many modifications and variations are possible in light of the above disclosure. For example, the parameters for the reactor, such as reactor type, temperature, pressure, size, etc., are dependent upon one another and modifications may be made to these parameters without substantially affecting the desired result. The foregoing description attempts to best explain the principle of the invention and its practical applications to thereby enable others skilled in the art to best utilize the invention in its various embodiments and with various modifications as are suited to the particular use contemplated. It is intended that the invention be defined by the following claims.

We claim:

1. A process for the destruction of organic compounds selected from the group consisting of nitriles, aromatics, heteroaromatics, amides, organic acids, aldehydes and alcohols from wastewater, comprising volatilizing the wastewater to produce a vaporous stream comprising steam and volatile organic compounds, contacting said vaporous stream with a catalyst in a reactor at an elevated temperature of at least 250° C. in the absence of added oxygen, so as to convert the volatile organic compounds to a mixture comprising hydrogen gas, and carbon dioxide, wherein the catalyst is selected from the group consisting of (1) a reduced supported nickel catalyst, (2) a reduced supported platinum group metal catalyst, or (3) a supported chromate, tungstate or molybdate of an iron group metal promoted with a barium salt.

2. The process of claim 1, wherein the wastewater comprises at least one of 2-(2-methoxyethoxy)ethanol), ethylene glycol, benzene, nitrobenzene or pyridine.

3. The process of claim 2, wherein the catalyst is a (1) reduced supported nickel catalyst or a (2) reduced supported platinum group metal catalyst, and wherein the catalyst is promoted with at least one alkali metal or alkaline earth metal.

4. The process of claim 1, wherein the reactor is selected from the group consisting of fixed-bed reactors, fluid-bed reactors, and transfer-line reactors.

5. The process of claim 1, wherein the elevated temperature is between about 250° C. and 1000° C.

6. The process of claim 1, wherein the elevated temperature is between about 350° C. and about 800° C.

7. The process of claim 1, wherein the process is operated at a reactor pressure of between about 1 atmosphere and about 100 psig.

8. The process of claim 1, wherein the process is operated at a steam to hydrocarbon weight ratio of between about 5:1 and about 10,000:1.

9. The process of claim 1, wherein the reactor liquid space velocity is between about 0.1 and about 1,000 volumes of wastewater per volume of catalyst per hour.

10. The process of claim 9, wherein the reactor liquid space velocity is between about 1.0 and about 100 volumes of wastewater per volume of catalyst per hour.

11. A process for the destruction of volatile organic compounds selected from the group consisting of nitriles, aromatics, heteroaromatics, amides, organic acids, aldehydes and alcohols from wastewater streams, comprising (i) volatilizing the wastewater to produce a vaporous stream comprising steam and the volatile organic compounds;

(ii) contacting, in a reactor, the vaporous stream with a catalyst at an elevated temperature of at least 250° C. in the absence of added oxygen so as to convert the volatile organic compounds in the presence of the steam to a mixture comprising hydrogen gas, and carbon dioxide, wherein the catalyst is selected from the group consisting of (1) a reduced supported nickel catalyst, (2) a reduced supported platinum group metal catalyst, or (3) a supported chromate, tungstate or molybdate of an iron group metal promoted with a barium salt; and (iii) cooling and separating an effluent stream from the reactor to produce a vaporous stream comprising hydrogen gas, and carbon dioxide and a liquid stream comprising water substantially free of organic compounds.

12. The process of claim 11, wherein the catalyst is a (1) reduced supported nickel catalyst or a (2) reduced supported platinum group metal catalyst, and wherein the catalyst is promoted with at least one alkali metal or alkaline earth metal.

13. The process of claim 11, wherein the reactor is selected from the group consisting of fixed-bed reactors, fluid-bed reactors, and transfer-line reactors.

14. The process of claim 11, wherein the elevated temperature is between about 250° C. and 1000° C.

15. The process of claim 14, wherein the elevated temperature is between about 350° C. and about 800° C.

16. The process of claim 11, wherein the process is operated at a pressure of between about 1 atmosphere and about 100 psig.

17. The process of claim 11, wherein the process is operated at a steam to hydrocarbon weight ratio of between about 5:1 and about 10,000:1.

18. The process of claim 11, wherein the reactor liquid space velocity is between about 0.1 and about 1,000 volumes of wastewater per volume of catalyst per hour.

19. The process of claim 18, wherein the reactor liquid space velocity is between about 1.0 and about 100 volumes of wastewater per volume of catalyst per hour.

20. The process of claim 11, wherein the wastewater comprises at least one of 2-(2-methoxyethoxy)ethanol), ethylene glycol, benzene, nitrobenzene or pyridine.

* * * * *